United States Patent [19]

Kijima et al.

[11] Patent Number: 4,911,936
[45] Date of Patent: Mar. 27, 1990

[54] YEAST-CONTAINING BEER

[75] Inventors: Masayo Kijima; Atsuko Miyazawa, both of Takasaki; Kazuo Yoshioka, Tokyo, all of Japan

[73] Assignee: Kirin Beer Kabushiki Kaisha, Tokyo, Japan

[21] Appl. No.: 169,628

[22] Filed: Mar. 18, 1988

[51] Int. Cl.$^4$ .............................................. C12C 11/00
[52] U.S. Cl. ......................................... 426/62; 426/8; 426/16; 426/592
[58] Field of Search ................... 426/8, 11, 16, 29, 62, 426/592

[56] References Cited

U.S. PATENT DOCUMENTS 1,898,047  2/1933  Glaubitz et al. ...................... 426/16
3,563,759  2/1971  Wolter et al. ......................... 426/16

OTHER PUBLICATIONS

Brauwelt, No. 6, 198–199, 1983 (English Translation).
"Namadaru Hakase No Sekai Beer Kiko", Mitsuru Murakami (English Translation).
"World Beer", Yoshio Kuroiwa (English Translation).

Primary Examiner—Marianne Cintins
Attorney, Agent, or Firm—Ladas & Parry

[57] ABSTRACT

A yeast-containing beer contained in a container and comprising a product beer the fermentation of which has been substantially completed and a yeast existing in a concentration of $10^2$ to $10^6$ cells/ml in said beer. Change of the beer flavor with the pasasge of time can be prevented by the yeast within the beer.

11 Claims, No Drawings

YEAST-CONTAINING BEER

BACKGROUND OF THE INVENTION

The present invention relates to a beer contained in a container which has been substantially fermented as a product beer and contains yeast.

More specifically, the present invention relates to a beer contained in a container which is prevented from changing its flavor after it has been charged into the container.

Fresh beer which has been just produced in a brewery has a good taste, but it is inevitable that a change in the flavor of the beer will occur with the passage of time even if it is a draft beer or one which has been subjected to heat treatment.

The change of the flavor of a beer is believed to be caused partly by oxidation. It is evident that beer is oxidized to a certain degree when consumers drink the beer which has been charged into containers for consumers, and thus the problem of the change of the flavor as mentioned above will be caused. If the oxidation of beer is suppressed to an extremely low level, the flavor will not be changed to an extent causing problems, but when the beer has been oxidized seriously, it will generate an unpleasant smell, the socalled oxidized flavor.

For the purpose of preventing the oxidation of beer after it has been charged into a container, beer manufacturers are making efforts for reducing the air content in the beer containers or for reducing the periods of storage in the market place.

In addition to such a passive prevention of oxidation or protection from oxidation, there is a method of adding ascorbic acid as an anti-oxidizing agent, and in fact the addition of ascorbic acid to beer is authorized officially by the Liquor Tax Act in Japan.

On the other side, a beer product containing yeast is being produced in Europe and other places. This known beer is produced by adding yeast to a beer the fermentation of which has not been substantially completed as a product beer and performing its final fermentation, that is, the secondary fermentation, in bottles to brew a beer having a characteristic flavor, which further comprises the effects of the use of wheat malt, the action of lactobacillus or the like.

SUMMARY OF THE INVENTION

An object of the present invention is to prevent the change of the flavor of a product beer with the passage of time by incorporating yeast with beer.

Accordingly, the yeast-containing beer according to the present invention is a yeast-containing beer contained in a container and comprising a product beer the fermentation of which has been substantially completed and a yeast existing in a concentration of $10^2$ to $10^6$ cells/ml in said product beer.

The yeast-containing beer according to the present invention comprises incorporating a small amount of yeast with a product beer which has been substantially fermented, the yeast incorporated therein significantly preventing the change of its flavor with the passage of time (reference: Example set forth hereinafter).

As mentioned above, the freshness of beer will be lost during storage for a long period because of the oxidation of its components to generate a deteriorated smell which is called oxidized flavor. Although the general profile of the oxidized flavor is not altogether evident at present, it is considered to be caused by the increase of volatile aldehydes. The key component of the oxidized flavor remains ambiguous, and thus the action of yeast in the present invention is not entirely clear. However, the suppression of the generation of the oxidized flavor is probably due to the suppression of the oxidation of alcohols to aldehydes. (It was also observed that once generated oxidized flavor was caused to disappear again by the addition of yeast. Such a phenomenon is considered to be caused by the reduction of the aldehydes thus produced into alcohols).

The primary effect which is brought about by the present invention is the aforementioned suppression of the generation of the oxidized flavor, and additional effects as follows can be anticipated. One of the effects is that, even if a beer contains diacetyl or α-acetolactic acid as the precursor of the former in an amount exceeding threshold values, it can be drunk without detection of diacetyl odor by contacting it with yeast. Diacetyl is a component which will cause an unpleasant inmatured taste in beer. The above-mentioned effect of yeast is brought about by the conversion of diacetyl into acetoin and finally into 2,3-butanediol upon contact with yeast.

An additional effect is the suppression of haze (non-biological haze) during storage. The non-biological haze during storage of beer is believed to be caused by the mechanism wherein polyphenols in beer oxidatively polymerize to form polymers, which have increased affinities to proteins as the source of haze and insolubilize. Such an insolubilization will be promoted by cooling before drinking and often causes chill haze which will greatly impair the appearance of the beer at the time of drinking. The suppression of haze formation by adding yeast is supposedly caused by the suppression of oxidative polymerization of the polyphenols.

The yeast-containing beer charged in a container according to the present invention is distinguished from the aforementioned beer containing yeast of the prior art on the point that the beer to be incorporated with yeast is a product beer which has been substantially fermented. Thus, the subject beer is a product beer which has been substantially fermented when the yeast is incorporated with it in a container, so that additional fermentation which may be caused in the container is restrained to an extremely low level, and the variation of the physical properties of the beer such as alcohol concentration, extract concentration or carbon dioxide concentration on charging it into the container and on drinking it is also restrained to a minimum level. After a beer has been charged into a container, the circumstance of the beer cannot be controlled by any beer manufacturer, and therefore the above stated condition of the present invention is important for beer as a modern mass-product.

DETAILED DESCRIPTION OF THE INVENTION

Subject beer

The beer intended to contain yeast according to this invention is a product beer the fermentation of which has been substantially completed.

The term "a product beer the fermentation of which has been substantially completed" means herein a beer the secondary fermentation of which has been substantially completed under low temperature.

The degree of completion of the fermentation can be considered to be the level that the difference between apparent attenuation limit and apparent attenuation is less than 10%, preferably less than 7%, and more preferably 5% or less. The definition and the determining method of these attenuations are described in Methods of Analysis of the ASBC, 7th revised edition, 1976. The apparent attenuation limit is an apparent attenuation of a 200 ml sample in a 500 ml Erlenmeyer flask, which has been fermented at 25° C. for 2 days after addition of 1 g of pressed yeast. It is an index to show the maximum amount of an extract which can be consumed.

The selection of the "beer" is optional, provided that the products are within the scope of beer in relation to microorganisms to carry out alcohol fermentation and their substrates. A typical example is a beer which is obtained by the use of beer yeast as the microorganism and barley malt as the main substrate.

Yeast

As the yeast to be incorporated in the product beer defined above, any one which is classified biologically into the class of yeast can be taken in the present invention. However, the yeast in the product of the present invention is often drunk directly, so that it is desirably one which is used for the production of foods or liquors or a non-toxic one.

Representatives of such yeasts are beer yeast, saké yeast, wine yeast and the like.

The present invention uses, as the subject beer in which yeast is to be incorporated, a product beer which has been substantially fermented and thus prevents additional fermentation of the beer. In such an aspect, conventional beer yeast is one of preferred yeasts of the present invention, and it is also possible to select and use a yeast suitable for accomplishing the object more completely.

A class of the yeasts selected from such a standpoint is a respiration-deficient yeast ("KAGAKU DAI-JITEN", vol. 3, p. 623, KYORITSU SHUPPAN K.K.). Such a yeast has capabilities which are expected of a yeast in the present invention and further has a lowered fermentation function as its respiratory capability is deficient. Therefore, when such a yeast is admixed with beer in a container according to the present invention, it is possible to suppress additional fermentation of the beer in the container to a minimum, and at the same time to prevent deterioration of the beer flavor in the container. The respiration-deficient strain of beer yeasts is observed as small colonies during the culture of a beer yeast. It can be used immediately or by further culturing the colonies separately to proliferate the strain, as a respiration-deficient yeast intended to be used in the present invention. It is also possible to obtain a respiration-deficient strain by mutation. The respiration-deficient yeast proliferates little in beer and is advantageous in suppressing turbidity of the product of the present invention due to the yeast.

Another group of the yeasts selected for preventing additional fermentation of beer in a container and exhibiting the effect of the present invention is a yeast which cannot easily utilize maltose and/or maltotriose as nutrient. Yeasts practically used as beer yeast are commonly the ones which have been grown so that they can use as a nutrient also maltose and/or maltotriose. However, even if such yeasts are used, the beer after being finished fermentation, that is to say according to the present invention, having the difference of apparent attenuation limit and apparent attenuation in an amount less than 7% often contains remaining sugars of which the most parts are maltose and/or maltotriose. Accordingly, if the yeast which cannot easily utilize maltose and/or maltotriose is incorporated with the beer in a container according to the present invention, no substrate for such a yeast is in fact present and thus fermentation in the container does not occur in fact (the effect of the present invention can be obtained even if such a yeast is employed). The property of not easily utilizing as a nutrient maltose and/or maltotriose includes a property which utilizes none of these sugars. Yeasts having such a property can be easily obtained by the selection on an agar culture medium (selection of yeasts which will hardly proliferate or ferment on a culture medium containing these sugars as the sugar source) or other methods such as mutation.

A typical yeast belonging to the class of the yeasts which cannot easily utilize maltose and/or maltotriose as a nutrient is one obtained from beer yeast, and sake yeast and wine yeast can also be classified into the class of such a yeast.

The yeast can comprise free yeast cells or a socalled immobilized yeast (which will be described in detail below).

Yeast-containing beer of the present invention and production thereof

The yeast-containing beer of the present invention comprises incorporating yeast in a certain concentration of $10^2$ to $10^6$ cells/ml with the aforementioned product beer the fermentation of which has been substantially completed and is charged in a container.

The term "to incorporate yeast" herein means to cause the yeast to be in a contacted state in the subject beer and can be carried out by an optional appropriate method. One of the most typical methods is to add the yeast to a prescribed concentration into a product beer in which yeast used in the production has been removed by filtration or inactivated by heating (it is also needless to say that in this case the yeast in the subject beer is in the concentration less than $10^2$ cells/ml).

Another method for incorporating yeast is that wherein the filtration or inactivation of yeast is carried out under a controlled condition to obtain beer in which some of the yeast remains in a prescribed concentration after this process. From the standpoint of controlling the yeast concentration or the sort of the yeast in the product of the present invention, it is also possible to add separately as described above yeast.

The concentration of the yeast in the beer is $10^2$ to $10^6$ cells/ml, preferably $10^2$ to $10^4$ cells/ml. The concentration of the yeast is measured by a colony counting method on an agar plate culture medium ("JIKKEN NOGEI KAGAKU", the last volume, 3rd edition; Faculty of Agricultural Chemistry, Department of Agriculture, University of Tokyo; ASAKURA SHOTEN) The yeast concentration in beer herein means the concentration immediately after charging of the beer according to the present invention into a container.

As described above, the yeast to be incorporated in beer can be the one which comprises free yeast cells or immobilized yeast cells. However, if a yeast comprising free yeast cells is used, the yeast cells will be dispersed into the product of the present invention and will give consumer an unnatural impression when it is consumed, and it is necessary to wait for the yeast cells to settle before drinking the beer.

From such aspects, it is preferable to use yeast in the form of an immobilized yeast. If the immobilized yeast has been previously placed within a container, there will be obtained a further effect in that the consumers will not recognize in fact the incorporated yeast on drinking the product of the present invention.

The immobilized yeast is now well-known in the art, and a variety of the yeast as well as the kinds of immobilizing materials or including materials and the immobilization methods can be utilized also in this invention. Although the use of the immobilized yeast is restricted to a certain degree in materials to be used for immobilization from the standpoint that it is intended to be used in foods, there may be mentioned an arginate and the like which are permitted to be food additives as an immobilizing material which can be used effectively. Porous inorganic materials such as porous glass are also appropriate immobilizing materials.

The immobilized yeast can be in optional forms such as beads, sheet, tape, string or the like. If it has the shape of beads, it can be immobilized within a container with an accommodating part in the shape of a "cage". If it has a one- or two-dimensional shape such as a sheet, tape, string or the like, it can be immobilized on the internal wall surface of a container with an adhering means (at its entire surface or one terminal of the sheet or the like) or other means (e.g., coating and insolubilization of a yeast dispersion liquid which can be immobilized in the shape of a sheet. The term "internal wall surface of a container" herein includes also the internal surface of a crown cap.

The product according to the present invention is contained in a container, in which the "container" means containers for consumer, specifically barrels (such as those having a volume of about 100 liters or less), bottles, cans or the like.

EXPERIMENTAL EXAMPLES

Taste tests (such as oxidized flavor, over-all evaluation of flavor, diacetyl flavor and the like) in the following examples were carried out by 10 panelists who tasted the samples maintained at a temperature of 8° C.

EXAMPLE 1

A bottom fermentation yeast for beer production [Saccharomyces cerevisiae (the "bottom fermentation yeast for brewing beer" hereinafter referring to the same yeast)] or a respiration-deficient strain obtained therefrom (which lacks a cytochrom enzyme, uptakes little oxygen and proliferates very slowly) was added to a product beer [yeast concentration: 0 cell/ml (the "product beer" hereinafter referring to the same concentration] in a concentration of $2 \times 10^5$ cells/ml, and the yeast-containing beer obtained was stored at 20° C. or 30° C. Using a beer to which no yeast had been added as a control, the change of the oxidized flavor and the over-all evaluation of the flavor was examined by profile test. For every sample, the amount of air in the headspace of a large bottle (633 ml) was adjusted to 1.8 ml.

As shown in Table 1, generation of oxidized flavor was evidently suppressed and lowering of the over-all evaluation of the flavor during storage was reduced upon the addition of the yeast. Some effectiveness was observed even in a respiration-deficient strain.

TABLE 1

Suppression of Generation of Oxidized flavor by Adding Yeast

| | Oxidized flavor (0 to 3) | | | Over-all evaluation of flavor (−3 to 3) | | |
|---|---|---|---|---|---|---|
| Storage condition | No yeast (control) | Addition of normal yeast | Addition of respiration-deficient yeast | No yeast (control) | Addition of normal yeast | Addition of respiration-deficient yeast |
| 20° C., | | | | | | |
| 1 week | 0.6 | 0 | 0.2 | −0.3 | 0.2 | 0.2 |
| 2 weeks | 1.2 | 0.2 | 0.3 | −1.2 | −0.1 | −0.4 |
| 1 month | 1.2 | 0.3 | 0.4 | −1.3 | −0.5 | −0.8 |
| 30° C., | | | | | | |
| 1 week | 0.7 | 0.4 | 0.4 | −0.6 | −0.4 | −0.4 |
| 2 weeks | 1.6 | 0.4 | 0.8 | −1.3 | −0.6 | −0.5 |
| 1 month | 2.3 | 0.6 | 0.8 | −2.3 | −0.6 | −0.8 |

Mean values of 10 panelists
Oxidized flavor:
0, not perceptible;
1, slightly perceptible;
2, moderately perceptible;
3, strongly perceptible.
Over-all evaluation of flavor:
−3, very unpleasant;
−2, moderatley unpleasant;
−1, slightly unpleasant;
0, neither pleasing unpleasant;
1, slightly pleasing;
2, moderately pleasing;
3, very pleasing.
(The measures of oxidized flavor and over-all evaluation are the same as above in the following tables.)

| | (Analysis of the beers after storage) | | | |
|---|---|---|---|---|
| Beer | Alcohol (w/w %) | Real extract (%) | Real attenuation (%) | Apparent attenuation (%) |
| Untreated beer | 3.84 | 3.52 | 68.0 | 83.9 |
| Respiration-deficient yeast, 20° C., 1 week | 3.85 | 3.50 | 68.2 | 84.1 |
| Respiration-deficient yeast, 20° C., 2 weeks | 3.86 | 3.48 | 68.4 | 84.3 |
| Respiration-deficient | 3.86 | 3.48 | 68.4 | 84.3 |

-continued

| Beer | (Analysis of the beers after storage) | | | |
|---|---|---|---|---|
| | Alcohol (w/w %) | Real extract (%) | Real attenuation (%) | Apparent attenuation (%) |
| yeast, 20° C., 1 month | | | | |
| Normal yeast, 20° C., 1 week | 3.91 | 3.37 | 69.4 | 85.6 |
| Normal yeast, 20° C., 2 weeks | 3.92 | 3.36 | 69.5 | 85.7 |
| Normal yeast, 20° C., 1 month | 3.92 | 3.36 | 69.5 | 85.7 |

Apparent attenuation limit was 87.8% in every sample.

EXAMPLE 2

The bottom fermentation yeast for brewing beer was added to a product beer in amounts of $2 \times 10^2$, $2 \times 10^3$, $2 \times 10^4$ and $2 \times 10^5$ cells/ml, respectively, and the yeast-containing beer obtained were stored at 30° C. for 2 weeks or 1 month or at 20° C. for 1 month or 2 months. Using a beer to which no yeast had been added as a control, the oxidized flavor and the over-all evaluation of flavor were compared for 5 samples. For every sample, the amount of air in the headspace of a large bottle (633 ml) was adjusted to 1.8 ml.

As shown in Tables 2 and 3, significant effects on the maintenance of freshness and the over-all evaluation of flavor were observed, even on adding the yeast in a very small amount of $2 \times 10^2$ cells/ml, as compared with the case of adding no yeast. However, it was necessary to add the yeast in an amount of $2 \times 10^3$ or $2 \times 10^4$ cells/ml in order to obtain a greater effect.

EXAMPLE 3

The bottom fermentation yeast for brewing beer was added in situ or after having been immobilized in calcium arginate (and forming the immobilized yeast into beads having a diameter of 3 mm in the conventional manner) in an amount of $3 \times 10^5$ cells/ml, and the yeast-containing beer obtained was stored at 30° C. for 1 or 3 months or at 20° C. for 1, 3 or 6 months. Using a beer to which no yeast had been added as a control, the oxidized flavor and the over-all evaluation of flavor were examined. For every sample, the amount of air in the headspace of a large bottle (633 ml) was adjusted to 1.8 ml.

As shown in Table 4, suppressive effect on the generation of oxidized flavor was observed even in the immobilized yeast as well as in unimmobilized yeast (free yeast). While the suppressive effect on the generation of oxidized flavor by the addition of the yeast became unnoticeable in 3 months of storage at 30° C., it was observed after 6 months of storage at 20° C.

TABLE 2

Added Amount of Yeast and Oxidized flavor

| Storage Condition | oxidized flavor (0 to 3) Added Amount of Yeast (cells/ml) | | | | | Mean ranking of oxidized flavor (1 to 5, from the weakest to the strongest) Added Amount of Yeast (cells/ml) | | | | |
|---|---|---|---|---|---|---|---|---|---|---|
| | 0 | $2 \times 10^2$ | $2 \times 10^3$ | $2 \times 10^4$ | $2 \times 10^5$ | 0 | $2 \times 10^2$ | $2 \times 10^3$ | $2 \times 10^4$ | $2 \times 10^5$ |
| 20° C., | | | | | | | | | | |
| 1 month | 1.2 | 0.3 | 0.1 | 0 | 0 | 5.0 | 2.5 | 2.8 | 2.3 | 2.3 |
| 2 months | 2.0 | 0.3 | 0.5 | 0.2 | 0.2 | 5.0 | 3.2 | 3.0 | 2.2 | 1.7 |
| 30° C., | | | | | | | | | | |
| 2 weeks | 1.9 | 0.7 | 0.7 | 0.3 | 0.4 | 5.0 | 3.3 | 3.0 | 1.7 | 2.0 |
| 1 month | 2.2 | 1.3 | 0.8 | 0.3 | 0.3 | 5.0 | 4.0 | 2.5 | 2.2 | 1.3 |

Taste tests were carried out in the same manner as in Example 1 (Table 1), and the ranking of the oxidized flavor in beers under respective conditions were determined.

TABLE 3

Added Amount of Yeast and Over-all Evaluation of Flavor

| Storage Condition | Over-all evaluation of flavor (−3 to 3) Added Amount of Yeast (cells/ml) | | | | | Mean ranking of over-all evaluation of flavor (1 to 5, from the best) Added Amount of Yeast (cells/ml) | | | | |
|---|---|---|---|---|---|---|---|---|---|---|
| | 0 | $2 \times 10^2$ | $2 \times 10^3$ | $2 \times 10^4$ | $2 \times 10^5$ | 0 | $2 \times 10^2$ | $2 \times 10^3$ | $2 \times 10^4$ | $2 \times 10^5$ |
| 20° C., | | | | | | | | | | |
| 1 month | −1.2 | 0.5 | 0.7 | 0.7 | 0.2 | 5.0 | 2.1 | 2.8 | 2.3 | 2.9 |
| 2 months | −1.8 | −0.2 | −0.4 | 0.3 | −0.3 | 5.0 | 3.2 | 3.0 | 1.4 | 2.4 |
| 30° C., | | | | | | | | | | |
| 2 weeks | −1.2 | −0.3 | −0.6 | 0.1 | 0 | 5.0 | 3.2 | 3.0 | 1.8 | 2.0 |
| 1 month | −1.8 | −1.1 | −0.8 | 0.1 | 0 | 5.0 | 3.7 | 3.0 | 1.8 | 1.6 |

Taste tests were carried out in the same manner as in Example 1 (Table 1), and the ranking of the over-all evaluation of the flavor in beers under respective conditions were determined.

TABLE 4

| | Suppression of Generation of Oxidized flavor by Adding Immobilized Yeast | | | | | |
|---|---|---|---|---|---|---|
| | Oxidized flavor (0 to 3) | | | Over-all evaluation of flavor (−3 to 3) | | |
| Storage condition | No yeast (control) | Addition of free yeast | Addition of immobilized yeast | No yeast (control) | Addition of free yeast | Addition of immobilized yeast |
| 20° C., | | | | | | |
| 1 month | 1.0 | 0.2 | 0.1 | −1.3 | −0.1 | −0.3 |
| 3 months | 2.2 | 0.3 | 0.3 | −2.0 | −0.2 | −0.1 |
| 6 months | 2.4 | 0.8 | 0.5 | −2.1 | −0.6 | −0.4 |
| 30° C., | | | | | | |
| 1 month | 2.1 | 0.3 | 0.3 | −1.6 | −0.6 | 0.3 |
| 3 months | 2.2 | 2.2 | 1.6 | −1.8 | −1.5 | −1.3 |

Taste tests were carried out in the same manner as in Example 1 (Table 1).

EXAMPLE 4

Diacetyl (threshold value: 0.08 ppm) was added to a product beer so that diacetyl was in a concentration of 0.2 ppm. The mixture was stored directly as it was or after addition of the bottom fermentation yeast for brewing beer in an amount of $10^6$ cells/ml at 20° or 30° C. for 8 or 20 days, and then taste tests were carried out.

TABLE 5

| | Removal of Diacetyl flavor by Adding Yeast | | | | | | | |
|---|---|---|---|---|---|---|---|---|
| | Oxidized flavor (0 to 3) | | Diacetyl flavor (0 to 3) | | Amount of diacetyl (ppm) | | over-all evaluation of flavor (−3 to 3) | |
| Storage condition | Addition of yeast | No yeast (Control) | Addition of yeast | No yeast (Control) | Addition of yeast | No yeast (Control) | Addition of yeast | No yeast (Control) |
| 20° C., | | | | | | | | |
| 8 days | 0 | 0.3 | 0.4 | 2.2 | 0.02 | 0.2 | 0 | −2.2 |
| 20 days | 0.3 | 0.7 | 0.3 | 2.4 | 0.02 | 0.2 | 0.4 | −1.9 |
| 30° C., | | | | | | | | |
| 8 days | 0.4 | 1.0 | 0.1 | 1.9 | 0.03 | 0.2 | −0.3 | −2.0 |
| 20 days | 0.6 | 1.9 | 0 | 1.7 | 0.02 | 0.2 | 0 | −2.2 |

Taste tests were carried out in the same manner as in Example 1 (Table 1).
The measure of diacetyl flavor is the same as the one of oxidized flavor (Table 1).

As shown in Table 5, the amount of diacetyl in a beer to which no yeast had been added remained at high levels throughout the storage period, and many panelists indicated diacetyl flavor. Furthermore, oxidized flavor was detected increasingly with the passage of storage period, and thus the over-all evaluation of flavor was not good. On the other hand, by the addition of yeast, diacetyl flavor was reduced to such a level that the panelists scarcely detected it, oxidized flavor during storage was also reduced and thus the over-all evaluation of flavor was not bad.

EXAMPLE 5

To a product beer was added α-acetolactic acid as a precursor of diacetyl in an amount to ensure that the concentration was 0.7 ppm based on diacetyl. The mixture was stored at 20° C. or 30° C. directly as it was or after the bottom fermentation yeast for brewing beer had been added in an amount of $4 \times 10^5$ cells/ml, and the diacetyl flavor, the oxidized flavor and the over-all evaluation of flavor were examined.

As shown in Table 6, although α-acetolactic acid as a precursor of diacetyl was contained in an amount exceeding the threshold value (0.08 ppm based on diacetyl) and converted to diacetyl during storage, it was converted to diacetyl, which was further converted to acetoin in the presence of the yeast, and thus none of the panelists indicated diacetyl flavor. A suppressive effect on the oxidized flavor by the addition of the yeast was also recognized, and the over-all evaluation of flavor was evidently better than that of the sample having no yeast. For the beer to which no yeast had been added and stored at 30° C., only a few panelists indicated the diacetyl flavor probably due to excessively strong oxidized flavor.

TABLE 6

| | Prevention of Generation of Diacetyl flavor by Adding Yeast | | | | | |
|---|---|---|---|---|---|---|
| | Oxidized flavor (0 to 3) | | Diacetyl flavor (0 to 3) | | Over-all evaluation of flavor (−3 to 3) | |
| Storage condition | Addition of yeast | No yeast (Control) | Addition of yeast | No yeast (Control) | Addition of yeast | No yeast (Control) |
| 20° C., | | | | | | |
| 5 days | 0.1 | 0.1 | 0.1 | 0.6 | −0.3 | −0.7 |
| 10 days | 0 | 0.8 | 0.2 | 1.4 | 0.3 | −1.2 |
| 30° C., | | | | | | |
| 5 days | 0.4 | 0.5 | 0 | 0.7 | −0.1 | −1.1 |
| 10 days | 0.4 | 2.2 | 0 | 0.5 | −0.1 | −2.2 |

Taste tests were carried out in the same manner as in Example 1 (Table 1).

EXAMPLE 6

To a product beer was added a bottom fermentation yeast for brewing beer or a respiration-deficient strain which had been derived from the yeast in an amount of $2\times10^5$ cells/ml. The yeast-containing beer obtained was stored at 30° C. for 2 months and then cooled at 8° C. for 24 hours, and the turbidity was measured to compare the formation of chill haze with that in the beer to which no yeast had been added as a control. All of the samples were stored in a 633 ml volume clear bottle, and the amount of air in the headspace was adjusted to 1.8 ml before storage.

As shown in Table 7, formation of chill haze could be suppressed by the addition of the yeast.

TABLE 7

| Suppression of formation of chill haze by the Addition of Yeast | |
|---|---|
| Sample | (Turbidity after storage at 30° C. for 2 months and at 8° C. for 24 hours) − (Turbidity before storage), (EBC, f.u.) |
| No addition of yeast | 0.60 |
| Addition of normal yeast | 0.16 |
| Addition of respiration-deficient yeast | 0.27 |

Note: EBC. f. u. is a unit of turbidity in accordance with the description in Analytica EBC., 3rd Edition, 1975.

EXAMPLE 7

The bottom fermentation yeast for brewing beer was added to beers having different apparent attenuation (in every beer, aparent attenuation limit was 87.4% and the concentration of yeast was 0 cell/ml in an amount of $2\times10^2$–$10^6$ cell/ml. After adjusting the amount of air in the headspaces to 1.8 ml, the yeast-containing beer obtained were stored at 20° C. for 2 weeks, and the apparent attenuation were examined.

TABLE 8

| Effect of Apparent Attenuation of Beer and Added Amount of Yeast on the increase in Apparent Attenuation in a Bottle | | | | |
|---|---|---|---|---|
| Added amount of yeast | Apparent attenuation of beer before-contact with yeast (difference with apparent attenuation limit) | | | |
| (cells/ml) | 82.7% (4.7) | 80.7% (6.7) | 78.6% (8.8) | 76.7% (10.7) |
| $10^6$ | 3.8 | 6.1 | 8.2 | 10.0 |
| $2\times10^5$ | 3.1 | 5.2 | 7.2 | 8.3 |
| $2\times10^4$ | 1.3 | 3.1 | 3.6 | 4.3 |
| $2\times10^3$ | 0.6 | 1.5 | 2.2 | 2.6 |
| $2\times10^2$ | 0.3 | 0.8 | 1.5 | 1.6 |

The increase in the apparent attenuation (%) was shown in the above table.

The increase in apparent attenuation by the contact of the yeast is the greatest if the apparent attenuation of the beer is made as low as possible (or the amount of residual sugar in beer is made as large as possible).

The added amounts of the yeast have also a great effect on the increase in the apparent attenuation. If the added amount of the yeast is $2\times10^4$ cells/ml or less, the increase in the apparent attenuation remains within 5% independently of the apparent attenuation of the beer (remaining sugar) intended to be contacted with. If the added amount of the yeast is $2\times10^5$ cells/ml or more, the increase in the apparent attenuation inevitably becomes 5% or more in beers, unless the beer has a difference of apparent attenuation degree and apparent attenuation limit of 5% or less.

EXAMPLE 8

The yeast which is practically used in brewing beer (Saccharomyces cerevisiae), Saccharomyces cerevisiae (ATCC 9080, which is not practically used in brewing beer) and saké yeast (KYOKAI. No. 7) were added to beer (having a yeast concentration of 0 cell/ml) charged into bottles (each of a volume of 633 ml) so that the concentration of the yeast in each bottle was $2\times10^5$/ml. The amount of air in the headspace was adjusted to 1.8 ml. After storing at 30° C. for 1 week and then cooling at 8° C., taste testing was carried out.

TABLE 9

| Effect of Addition of Yeasts Which are not Practically Used in the Brewing of Beer | | | |
|---|---|---|---|
| Addition of yeast | Oxidized flavor (0 to 3) | Over-all evaluation of flavor (−3 to 3) | Apparent attenuation (%) |
| No yeast | 1.3 | −0.6 | 82.9 |
| Beer yeast | 0.2 | 0 | 84.9 |
| S. Cerevisiae (ATCC 9080) | 0.3 | 0.1 | 82.9 |
| Sake yeast (KYOKAI. No. 7) | 0 | 0.3 | 82.9 |

Mean values of 10 panelists.

A suppressive effect on the generation of oxidized flavor was recognized even in the yeast which is not practically used in brewing beer, and the over-all evaluation of flavor after storage was also good.

Glucose had been almost completely consumed before the addition of the yeast, and most of the fermentable sugars remaining at the addition of the yeast were maltose and maltotriose. Beer yeast uptakes these sugars and thus fermentation during storage inevitably proceeds. However, the two yeasts other than the beer yeast cannot easily uptake these sugars, and thus the increase in the apparent attenuation during storage is negligible.

EXAMPLE 9

The bottom fermentation yeast for brewing beer or the respiration-deficient yeast was added to beer (having a yeast concentration of 0 cell/ml) charged into a bottle (having a volume of 633 ml) so that the concentration of the yeast in each bottle was $2\times10^5$ or $2\times10^4$ cells/ml. The amount of air in the headspace was adjusted to 1.8 ml. After storing at 20° C. or 30° C. for 1 week and then cooling at 8° C. for 24 hours, the turbidity was measured. As most of the yeast precipitates on the bottom of the bottle, the turbidity was measured for the samples which were taken out of the bottle by decanting the supernatant (turbidity of the supernatant) and the samples which were taken out of the bottle by mixing thoroughly the content in the bottle and pouring the mixed content (turbidity of the whole).

TABLE 10

Suppression of haze formation by the Use of Respiration-Deficient Yeast

| Added amount of yeast (cells/ml) | Yeast | Turbidity of the whole (EBC. f.u.) | | | Turbidity of the Supernatant (EBC. f.u.) | |
| --- | --- | --- | --- | --- | --- | --- |
| | | Before storage | 20° C. 1 week | 30° C. 1 week | 20° C. 1 week | 30° C. 1 week |
| $2 \times 10^5$ | Normal yeast | 2.37 | 7.53 | 3.97 | 0.54 | 0.52 |
| | Respiration-deficient yeast | 2.36 | 4.22 | 3.72 | 0.54 | 0.51 |
| $2 \times 10^4$ | Normal yeast | 0.65 | 1.38 | 0.94 | 0.53 | 0.48 |
| | Respiration-deficient yeast | 0.66 | 0.90 | 0.77 | 0.49 | 0.48 |

In the case of the beer without addition of yeast, initial turbidity was 0.46, and the turbidities after storage for 1 week at 20° C. and 30° C. were 0.48 and 0.51 EBC. f.u., respectively.

As long as the supernatant is to be drunk, the turbidity caused by the yeast can be considered to cause no problem. However, for the turbidity of the whole (measured after mixing), the use of respiration-deficient yeast results in less turbidity as compared with the normal yeast. Such a phenomenon becomes remarkable upon storage at 20° C.

As is apparent from "Analysis of the beers after storage" in Example 1, the fermentation of a product beer can be suppressed to a low level during storage if the rrespiration-deficient yeast is used.

What is claimed is:

1. A yeast-containing product beer comprising
    (1) a beer the fermentation of which has been substantially completed such that the difference between an apparent attenuation limit and an apparent attenuation of said product beer is no greater than 5%, wherein said apparent attenuation limit is defined as the apparent attenuation of a 200 ml sample of beer in a 500 ml flask which has been fermented at 25° C. for 2 days after addition of 1 grams of yeast; and
    (2) a yeast added to said product beer so that the concentration of the yeast in the beer is $10^2$ to $10^4$ cells/ml,
said yeast-containing product beer being contained in a container having a volume up to 100 liters.

2. A yeast-containing beer according to claim 1, wherein said added yeast is of the same strain as that of the yeast used for the production of said beer.

3. A yeast-containing beer according to claim 1, wherein said yeast is a yeast which cannot utilize a sugar selected from the group consisting of maltose and maltotriose as a nutrient.

4. A yeast-containing beer according to claim 1, wherein said yeast is a respiration-deficient yeast.

5. A yeast-containing beer according to claim 1, wherein said yeast is dispersed in the beer.

6. A yeast-containing beer according to claim 1, wherein said yeast is an immobilized yeast.

7. A yeast-containing beer according to claim 6, wherein said immobilized yeast is fixed within said container.

8. A yeast-containing beer according to claim 1, wherein said yeast is a saké yeast.

9. A yeast-containing beer according to claim 1, wherein said yeast is wine yeast.

10. A yeast-containing beer according to claim 1, wherein the container is a glass bottle.

11. A yeast-containing beer according to claim 1, wherein the container is a can.

* * * * *